(12) United States Patent
Woo

(10) Patent No.: US 8,939,038 B2
(45) Date of Patent: Jan. 27, 2015

(54) TORQUE SENSOR

(75) Inventor: Myungchul Woo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 191 days.

(21) Appl. No.: 13/483,911

(22) Filed: May 30, 2012

(65) Prior Publication Data

US 2013/0133437 A1 May 30, 2013

(30) Foreign Application Priority Data

Nov. 29, 2011 (KR) .......................... 10-2011-0125601

(51) Int. Cl.
*G01L 3/00* (2006.01)
(52) U.S. Cl.
USPC ............ 73/862.335; 73/862.331; 73/862.332; 73/862.333; 73/862.334; 73/862.336; 73/862.337; 73/862.338
(58) Field of Classification Search
CPC ........... G01L 3/104; G01D 5/145; G01B 7/30
USPC ....................... 73/862.331–862.338
See application file for complete search history.

(56) References Cited

U.S. PATENT DOCUMENTS

| | | | |
|---|---|---|---|
| 8,375,810 B2* | 2/2013 | Bae et al. .................. | 73/862.334 |
| 2007/0157740 A1* | 7/2007 | Jerems et al. ............. | 73/862.328 |
| 2008/0092671 A1* | 4/2008 | Maehara ................... | 73/862.331 |
| 2008/0106873 A1* | 5/2008 | Okuya ......................... | 361/748 |
| 2009/0206827 A1* | 8/2009 | Aimuta et al. ............ | 324/207.25 |
| 2010/0013463 A1* | 1/2010 | Ozaki et al. ................ | 324/207.2 |
| 2010/0071481 A1* | 3/2010 | Arita et al. ................ | 73/862.333 |
| 2010/0194385 A1* | 8/2010 | Ronnat et al. ............ | 324/207.25 |
| 2010/0319466 A1* | 12/2010 | Bae et al. .................. | 73/862.325 |
| 2011/0126639 A1* | 6/2011 | Behrens .................... | 73/862.193 |
| 2011/0140690 A1* | 6/2011 | Antraygue ............... | 324/207.25 |
| 2011/0167920 A1* | 7/2011 | Rink et al. ...................... | 73/760 |
| 2011/0167928 A1* | 7/2011 | Maehara .................. | 73/862.325 |
| 2011/0214515 A1* | 9/2011 | Kim et al. ................ | 73/862.325 |
| 2011/0309826 A1* | 12/2011 | Braun et al. ............. | 324/207.25 |

(Continued)

FOREIGN PATENT DOCUMENTS

| | | |
|---|---|---|
| EP | 2314499 A1 | 4/2011 |
| WO | WO-2010-007068 A1 | 1/2010 |
| WO | WO-2011-062431 A2 | 5/2011 |

OTHER PUBLICATIONS

Troughton, Michael J., "Handbook of Plastics 1-7 Joining: A Practical Guide," Jan. 1, 1997, pp. 134-136.

(Continued)

*Primary Examiner* — Lisa Caputo
*Assistant Examiner* — Philip Cotey
(74) *Attorney, Agent, or Firm* — Saliwanchik, Lloyd & Eisenschenk

(57) ABSTRACT

Disclosed is a torque index sensor, the sensor including a housing, a stator mounted at a space inside the housing, a magnet arranged inside the stator to rotate with a rotation shaft, a PCB (Printed Circuit Board) fixedly mounted inside the housing and mounted with a first magnetic element outputting a magnetization signal in response to rotation of the magnet, at least one or more fixing bosses protrusively formed at the housing, and a collector having a plurality of through holes penetratively formed at a position corresponding to that of the fixing boss and concentrating a magnetic field for guiding a magnetic flux of the magnet, wherein the fixing boss is thermally fused after passing the through hole to tightly fix the collector at an inner surface of the housing.

7 Claims, 2 Drawing Sheets

(56) References Cited

U.S. PATENT DOCUMENTS

2012/0062216 A1* 3/2012 Kang .......................... 324/207.2
2012/0073386 A1* 3/2012 McDonald et al. ........ 73/862.09
2012/0260746 A1* 10/2012 Lee .......................... 73/862.332
2012/0297916 A1* 11/2012 Lee .......................... 73/862.193

OTHER PUBLICATIONS

European Search Report dated Dec. 19, 2013 in European Application No. 12168924.

* cited by examiner

TORQUE SENSOR

CROSS-REFERENCE TO RELATED APPLICATION

This application claims the benefit under 35 U.S.C. §119 of Korean Patent Application No. 10-2011-0125601, filed Nov. 29, 2011, which is hereby incorporated by reference in its entirety.

BACKGROUND

1. Field of the Disclosure

The present disclosure relates to a torque index sensor.

2. Discussion of the Related Art

Generally, almost every vehicle employs an electric power-assist steering system. The electric power-assist steering system generates an assist force based on the steering torque and the steering angle, so as to enhance the steering performance of the vehicle.

That is, a steering system that assists a steering force of a vehicle with a separate power is used to enhance the motion stability of a vehicle.

Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is such that an Electronic Control Unit (ECU) drives a motor in response to steering conditions detected by a speed sensor, a torque angle sensor and a torque index sensor to enhance a steering stability and provide a quick restoring force, whereby a driver can safely steer a vehicle.

Meantime, there is a need to measure a steering angular velocity, in addition to torque applied to a steering shaft and a steering angle, in order for the power device to be engaged to a force manipulating a steering wheel.

Generally, although an angle sensor is used in order to measure a rotation angle of the steering shaft, and a torque index sensor is used to measure a steering torque, a TAS (Torque Angle Sensor) is widely used recently that is capable of detecting a torque and a rotation angle in a single sensor.

However, the TAS capable of detecting the steering angle and the steering angular velocity is disadvantageous in that a manufacturing process is complicated, and failure and erroneous operations frequently occur, whereby TIS (Torque Index Sensor) of torque sensor method replaces the TAS.

A conventional configuration of TIS entitled as "torque sensor arrangement with rotational angle index detection" is disclosed in Korean Laid-Open Patent No.: 2011-0041468, where the sensor arrangement comprises a torque sensor for measuring a torque acting on a first shaft, wherein the sensor arrangement further comprises a rotational angle index unit that is adapted to detect and/or a defined rotational angle and/or a defined rotational angle range.

However, the torque sensor thus described is provided with a collector as a part for concentrating a magnetic flux of a magnet. The collector is secured at a housing, and if a coupling between the collector and the housing is loosened, a distance between the collector and the housing may become uneven to generate an error in a measured value of the sensor. Particularly, in case of a torque sensor applicable to an Electronic Power Steering (EPS) system that operates at a relatively higher temperature in the range of 80° C.~120° C. than a room temperature, it is difficult to secure the collector using a double-sided tape or an adhesive.

It is, therefore, desirable to overcome the above problems and others by providing a collector fixing structure configured to guaranteeing reliability at a high temperature.

BRIEF SUMMARY

This section provides a general summary of the disclosure, and is not a comprehensive disclosure of its full scope or all of its features.

The present disclosure is directed to cope with the above-mentioned problems/disadvantages and it is an object of the present disclosure to provide a torque index sensor improved in structure configured to tightly fix a collector even at a high temperature and to inhibit the collector from being disengaged.

Technical problems to be solved by the present disclosure are not restricted to the above-mentioned description, and any other technical problems not mentioned so far will be clearly appreciated from the following description by the skilled in the art.

In a general aspect of the present disclosure, there is provided a torque index sensor comprising: a housing; a stator mounted at a space inside the housing; a magnet arranged inside the stator to rotate with a rotation shaft; a PCB (Printed Circuit Board) fixedly mounted inside the housing and mounted with a first magnetic element outputting a magnetization signal in response to rotation of the magnet; at least one or more fixing bosses protrusively formed at the housing; and a collector having a plurality of through holes penetratively formed at a position corresponding to that of the fixing boss and concentrating a magnetic field for guiding a magnetic flux of the magnet, wherein the fixing boss is thermally fused after passing the through hole to tightly fix the collector at an inner surface of the housing.

Preferably, but not necessarily, the collector includes at least one or more through holes.

Preferably, but not necessarily, two collectors, in a pair, are vertically and symmetrically mounted at an inner surface of the housing about the first magnetic element.

Preferably, but not necessarily, the collector is brought into contact at a distal end with the first magnetic element.

Preferably, but not necessarily, the PCB further includes a second magnetic element detecting an index magnet mounted at the rotation shaft.

Preferably, but not necessarily, the through holes, in a pair, are symmetrically formed based on an imaginary line passing a weight center of the collector.

Preferably, but not necessarily, the through hole is formed at an area surface-contacted to the housing coupled by the collector.

The torque index sensor according to the present disclosure has an advantageous effect in that a fixing boss protrusively formed at an inner side of a housing is thermally fused after passing a through hole formed at a collector, such that even if the torque index sensor is used for a long time at a high temperature, the collector is inhibited from being disengaged and is tightly fixed to the housing to enhance a product reliability.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

Figure 1:
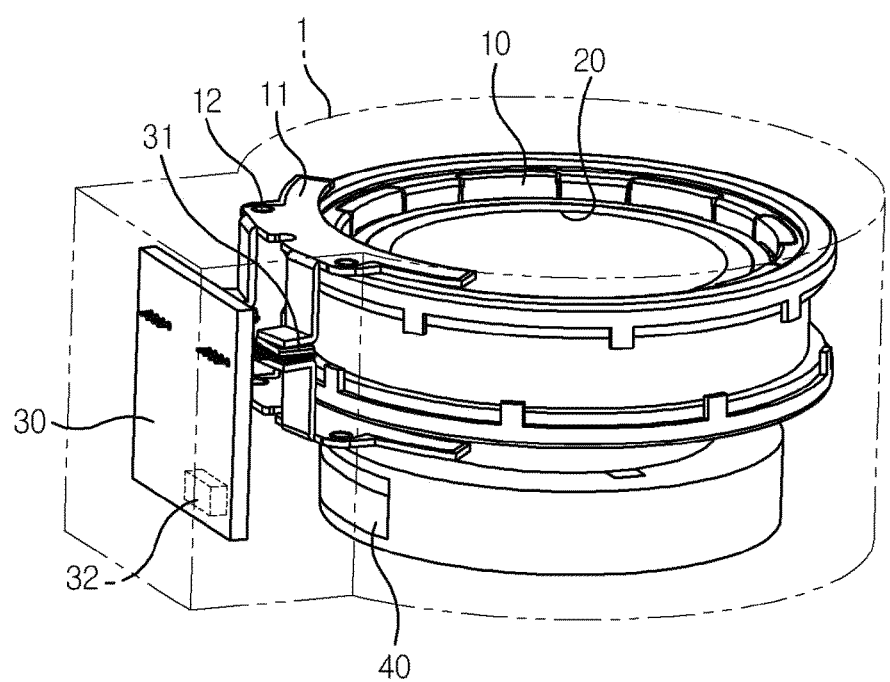
FIG. 1 is a schematic perspective view illustrating essential parts of a torque index sensor according to an exemplary embodiment of the present disclosure.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Now, a torque index sensor according to exemplary embodiments of the present disclosure will be described in detail with reference to FIGS. 1, 2 and 3. FIG. 1 is a schematic perspective view illustrating essential parts of a torque index sensor according to an exemplary embodiment of the present disclosure, FIG. 2 is a plan view of FIG. 1, and FIG. 3 is an enlarged schematic view that illustrates an essential part of FIG. 2.

Figure 2:
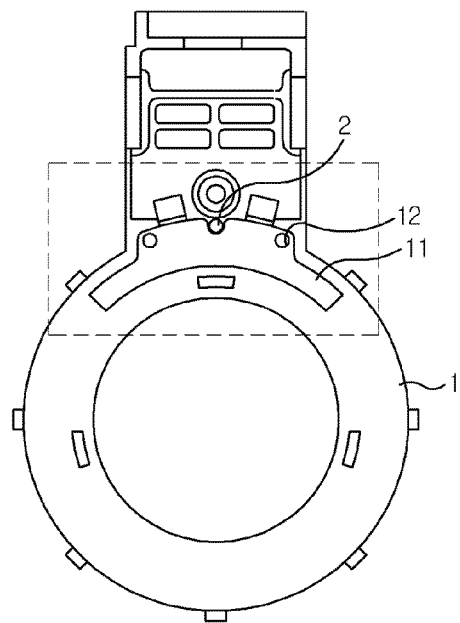
FIG. 2 is a plan view of FIG. 1.
Figure 3:
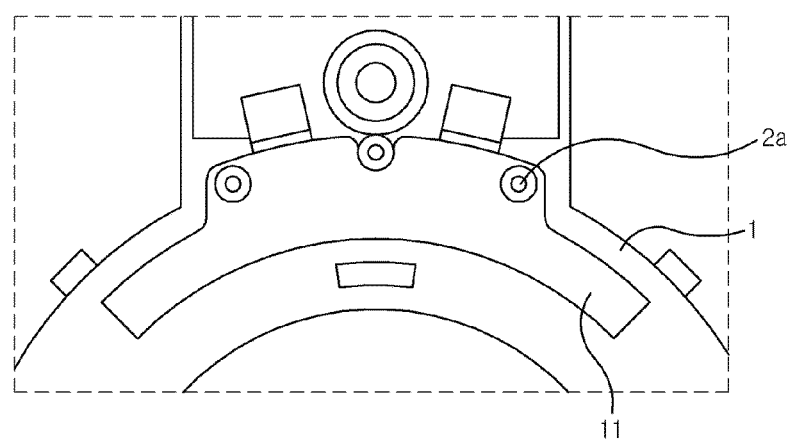
FIG. 3 is an enlarged schematic view illustrating an essential part of FIG. 2.

Referring to FIGS. 1, 2 and 3, a torque index sensor according to an exemplary embodiment of the present disclosure includes a housing (1), a stator (10), a magnet (20) and a PCB (Printed Circuit Board), where the housing (1) is protrusively formed with at least one or more fixing bosses (2), and the stator (10) is provided with a collector (11) having a through hole (12) penetratively coupled by the fixing boss (2).

The housing (1) forms an external look of the torque index sensor in resin material, but the material is not limited thereto and any material that has a high durability including a metal material will do. The housing (1) mountable on a rotation shaft (not shown) of a steering wheel is fixedly arranged regardless of and without causing any hindrance to rotation of the rotation shaft.

Referring to FIG. 2, the housing (1) is protrusively formed at an inner lateral surface with a plurality of fixing bosses (2), preferably at least two fixing bosses. Although not illustrated, one fixing boss (2) and two fixing bosses (2) each at a distal end of the inner lateral surface may be formed.

The stator (10) is provided in a tooth shape. The stator (10) is also provided at a distal end with the collector (11) for effectively collecting a magnetic field of the magnet (20). Each of the collectors (11) is symmetrically arranged at an upper side and a bottom side of the stator (10) as shown in FIG. 1. The collector (11) serves to concentrate the magnetic field by guiding the magnetic flux of the magnet (20). Furthermore, the collector (11) is formed at an area corresponding to that of the fixing boss (2) with a plurality of through holes (12).

According to an exemplary embodiment of the present disclosure, two through holes (12) are provided. However, it would be preferable that a plurality of through holes (12) be formed at an area surface-contacted by the housing (1), and symmetrically formed about the collector (11).

Therefore, the fixing boss (2) is thermally fused after passing through the through hole (12) to form a screw head-shaped head (2a), as shown in FIG. 3. The head (2a) presses the collector (11) toward an inner lateral surface of the housing (1) to tightly secure the collector (11) to the housing (1). That is, in a case the fixing boss (2) having passed the through hole (12) is hot-pressed, the resin-materialed fixing boss (2) is flatly pressed to form the head (2a) and to be tightly brought into contact with the collector (11). The head (2a) is fixed in a surface-contacted state by pressing the collector (11) to the inner lateral surface of the housing (1).

The magnet (20) is provided in a ring shape, mounted at an inner wall surface of the stator (10) and rotates in association with rotation of the rotation shaft (not shown) of the steering wheel.

The PCB (30) is formed with a first magnetic element (31) detecting a torque signal of the rotation shaft rotating in association with the steering wheel by detecting the magnetic force of the magnet (30). The first magnetic element (31) generally includes a pair of linear Hall ICs. The PCB (30) is preferably arranged at an outmost area of the torque index sensor, as illustrated in FIG. 1.

Meanwhile, an index magnet (40) may be further mounted for receiving a rotation signal of the rotation shaft (not shown) as shown in FIG. 1, if need arises. The index magnet (40) is installed at a magnet holder mounted at the rotation shaft and changed in position in response to the rotation of the rotation shaft.

Furthermore, the PCB (30) may be formed with a second magnetic element (32) for detecting the magnetic field of the magnet (40). The second magnetic element (32) functions to detect rotation of the index magnet (40) using a pulse signal and output an index pulse signal for calculating a steering angle of the rotation shaft. Generally, the second magnetic element (32) is provided as a Hall switch to output the index pulse signal.

As apparent from the foregoing, the torque index sensor thus configured according to the exemplary embodiment of the present disclosure has an industrial applicability in that a fixing boss (2) protrusively and integrally formed at an inner side of a housing (1) is thermally fused after passing a through hole (12) penetratively formed at a collector (11) to fixedly secure the collector (11) to the housing (1), such that, even if the torque index sensor is used for a long time at a high temperature, the collector (11) can be inhibited from being disengaged and tightly fixed to the housing (1) enhance a product reliability, whereby the collector (11) and the magnet (20) can maintain a predetermined distance at all times to enhance reliability of a measurement value of the sensor.

Furthermore, in a case the fixing boss (2) having passed the through hole (12) is thermally fused to form a flatly pressed head (2a) as shown in FIG. 3, the collector (11) can be pressed to the housing (1) side with as much pressure as a contact area between the head (2a) and the collector (11), whereby a much tighter coupling can be kept.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A torque index sensor comprising:
    a housing;
    a stator mounted at a space inside the housing;
    a magnet arranged inside the stator to rotate with a rotation shaft;
    a PCB (Printed Circuit Board) fixedly mounted inside the housing and mounted with a first magnetic element outputting a magnetization signal in response to rotation of the magnet;
    a first fixing boss and a second fixing boss protrusively formed at the housing; and
    an upper collector concentrating a magnetic field and having a peripheral boss-receiving notch and a first through hole, wherein the notch and the first through hole are formed at positions corresponding to those of the first and second fixing bosses, respectively,
    wherein the first fixing boss and the second fixing boss pass through the notch and the first through hole, respectively, and are thermally fused to tightly fix the upper collector at an inner surface of the housing;
    wherein the torque index sensor further comprises a lower collector,
    wherein the upper and lower collectors are vertically and symmetrically mounted at an inner surface of the housing about the first magnetic element,
    wherein the torque index sensor further comprises an index magnet mounted at the rotation shaft under the lower collector,
    wherein the PCB further comprises a second magnetic element detecting the index magnet, and
    wherein a surface of the PCB on which the second magnetic element is mounted is perpendicular to the top surface of the upper collector.

2. The torque index sensor of claim 1, wherein the upper collector further comprises a second through hole.

3. The torque index sensor of claim 1, wherein the upper collector is brought into contact at a distal end with the first magnetic element.

4. The torque index sensor of claim 2, wherein the first and second through holes are symmetrically formed based on an imaginary line passing a weight center of the upper collector.

5. The torque index sensor of claim 2, wherein the first and second through holes are formed at an area surface-contacted to the housing coupled by the upper collector.

6. The torque index sensor of claim 2, further comprising a third fixing boss, wherein the second through hole is formed at a position corresponding to that of the third fixing boss, and wherein the third fixing boss passes through the second through hole and is thermally fused.

7. The torque index sensor of claim 4, further comprising a third fixing boss, wherein the second through hole is formed at a position corresponding to that of the third fixing boss, and wherein the third fixing boss passes through the second through hole and is thermally fused.

* * * * *